United States Patent
Jeon et al.

(10) Patent No.: US 10,237,876 B2
(45) Date of Patent: Mar. 19, 2019

(54) METHOD AND DEVICE FOR CONTROLLING ACCESS OF TERMINAL FOR EFFICIENT USE OF RESOURCES IN MOBILE COMMUNICATION SYSTEM

(71) Applicant: Samsung Electronics Co., Ltd., Suwon-si, Gyeonggi-do (KR)

(72) Inventors: Nam-Ryul Jeon, Incheon (KR); Ki-Back Kim, Seoul (KR); Han-Seok Kim, Seoul (KR); Hyun-Ho Im, Seoul (KR); Ji-Hyeon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 207 days.

(21) Appl. No.: 15/107,709

(22) PCT Filed: Dec. 19, 2014

(86) PCT No.: PCT/KR2014/012576
§ 371 (c)(1),
(2) Date: Jun. 23, 2016

(87) PCT Pub. No.: WO2015/099361
PCT Pub. Date: Jul. 2, 2015

(65) Prior Publication Data
US 2016/0323889 A1 Nov. 3, 2016

(30) Foreign Application Priority Data
Dec. 27, 2013 (KR) .......................... 10-2013-0165600

(51) Int. Cl.
*H04W 72/04* (2009.01)
*H04L 5/00* (2006.01)
(Continued)

(52) U.S. Cl.
CPC ....... *H04W 72/0486* (2013.01); *H04L 5/0032* (2013.01); *H04W 76/36* (2018.02); *H04L 5/0098* (2013.01); *H04W 36/22* (2013.01)

(58) Field of Classification Search
CPC ..... H04W 72/04; H04W 76/06; H04W 36/22; H04L 5/00
See application file for complete search history.

(56) References Cited

U.S. PATENT DOCUMENTS

2007/0133468 A1* 6/2007 Hara .................... H04L 12/5601
370/331
2008/0049675 A1* 2/2008 Burgan ................. H04W 36/24
370/331
(Continued)

FOREIGN PATENT DOCUMENTS

| CN | 102326424 A | 1/2012 |
| CN | 102869066 A | 1/2013 |

(Continued)

OTHER PUBLICATIONS

Chinese Office Action dated Aug. 31, 2018, issued in Chinese Patent Application No. 201480070893.5.

*Primary Examiner* — Xavier Szewai Wong
(74) *Attorney, Agent, or Firm* — Jefferson IP Law, LLP

(57) ABSTRACT

Embodiments of the present disclosure provide terminal connection control method and apparatus in a base station of a mobile communication system which supports a Carrier Aggregation (CA) function. According an embodiment of the present disclosure, a method for control a connection of a terminal in a base station of a mobile communication system includes determining whether there is a Primary Cell (PCell) connection request from a terminal with respect to an i-th cell (herein, i is a positive integer greater than 0 and equal to or smaller than k) corresponding to one of k cells (herein, k is a positive integer greater than 0) in the base
(Continued)

station; if there is the PCell connection request from the terminal, determining whether to allow the PCell connection for the i-th cell of the terminal based on a threshold load corresponding to a maximum limit of a resource allocated to each cell; and if the PCell connection for the i-th cell of the terminal is allowed, determining whether to release a Secondary Cell (SCell) connection for at least one or more terminals which maintain the SCell connection for the i-th cell by comparing an i-th resource load allocated to the i-th cell with the threshold load.

18 Claims, 16 Drawing Sheets

(51) Int. Cl.
*H04W 76/36* (2018.01)
*H04W 36/22* (2009.01)

(56) References Cited

U.S. PATENT DOCUMENTS

| | | |
|---|---|---|
| 2011/0038280 A1 | 2/2011 | Jung et al. |
| 2011/0243106 A1 | 10/2011 | Hsu et al. |
| 2011/0269499 A1 | 11/2011 | Vikberg et al. |
| 2013/0084872 A1 | 4/2013 | Suga |
| 2013/0225174 A1 | 8/2013 | Hunukumbure |
| 2014/0010217 A1* | 1/2014 | Gong ............... H04L 5/006 370/336 |
| 2014/0016593 A1* | 1/2014 | Park ............... H04L 5/001 370/329 |
| 2014/0349659 A1* | 11/2014 | Ishii ............... H04W 76/10 455/444 |
| 2016/0037405 A1* | 2/2016 | Choi ............... H04W 76/10 455/444 |
| 2016/0057756 A1* | 2/2016 | Nammi ............ H04W 72/0466 370/335 |

FOREIGN PATENT DOCUMENTS

| | | |
|---|---|---|
| WO | 2012/172397 A2 | 12/2012 |
| WO | 2013/012294 A1 | 1/2013 |
| WO | 2013/102487 A1 | 7/2013 |
| WO | 2013/119018 A1 | 8/2013 |
| WO | 2013/143649 A1 | 10/2013 |

* cited by examiner

METHOD AND DEVICE FOR CONTROLLING ACCESS OF TERMINAL FOR EFFICIENT USE OF RESOURCES IN MOBILE COMMUNICATION SYSTEM

TECHNICAL FIELD

The present disclosure relates generally to connection control in a mobile communication system which supports a Carrier Aggregation (CA) technology.

BACKGROUND ART

When the number of terminals connecting to one cell in a base station increases over a certain level in a mobile communication system, a processing load increases and thus a minimum performance normally serviced to the connected terminals cannot be guaranteed. To prevent such an overload status, the base station has a function for specifying an allowable connection limit for ensuring the minimum performance of the connected terminals in a cell unit and rejecting a connection request with respect to a connection request exceeding this limit. This function is referred to as call admission control. The call admission control in a multi-user mobile communication system initiates when the terminal initially connects, when an idle terminal requests Radio Resource Control (RRC) connection from a cell, or when a handover to a corresponding cell is requested from another cell.

The base station specifies and has the maximum number of connection allowable connected terminals per cell. Also, the base station counts and has the number of currently connected terminals in every connection and connection release of the terminal. For example, when receiving a terminal's connection request, the base station determines whether a sum of the number of the currently connected terminals and the number of connection requested terminals exceeds the number of the maximum number of the connection allowable connected terminals, accepts the connection and counts the number of the currently connected terminal when not exceeding, and rejects the connection of a corresponding terminal when exceeding.

However, a call connection control method for a conventional mobile communication system does not consider the CA function at all, and thus assumes that one serving cell resource is used per terminal. When the base station supporting the CA function uses the conventional call connection control method while a conventional terminal not supporting the CA and a terminal supporting the CA are mixed, resources of a Medium Access Control (MAC) or Physical (PHY) layer are not properly managed and accordingly a problem arises.

In other words, since there is only one serving cell which manages data transmission and reception per terminal in load calculation for the connection admission control, it was enough for a conventional base station before adopting the CA function to consider only the number of terminals connected to a corresponding cell when calculating the load according to the number of terminals per cell of a base station system. However, although the CA function is adopted, a problem arises when the existing connection admission control function is retained without changing it.

Since resource consumption is considerable due to terminals which add a corresponding cell as a Secondary Cell (SCell) and the load calculation does not consider a resource used as the SCell, a terminal connection requesting the connection as a Primary Cell (PCell) is accepted and an abnormal operation is caused by overloading in MAC/PHY resource processing. Also, when there is a SCell add request for the MAC/PHY resource of a current cell from another cell, there is no means for limiting this.

DETAILED DESCRIPTION OF THE INVENTION

Technical Problem

Thus, embodiments of the present disclosure relate to terminal connection control method and apparatus for efficient resource utilization in a base station of a mobile communication system which supports a Carrier Aggregation (CA) function for checking a MAC/PHY resource use status of a cell and thus determining whether the terminal connects so as to maximize available resources utilization of a base station.

Technical Solution

According to one aspect of the present disclosure, a method for control a connection of a terminal for efficient resource utilization in a base station of a mobile communication system supporting a CA function includes determining whether there is a Primary Cell (PCell) connection request from a terminal with respect to an i-th cell (herein, i is a positive integer greater than 0 and equal to or smaller than k) corresponding to one of k cells (herein, k is a positive integer greater than 0) in the base station; if there is the PCell connection request from the terminal, determining whether to allow the PCell connection for the i-th cell of the terminal based on a threshold load corresponding to a maximum limit of a resource allocated to each cell; and if the PCell connection for the i-th cell of the terminal is allowed, determining whether to release a Secondary Cell (SCell) connection for at least one or more terminals which maintain the SCell connection for the i-th cell by comparing an i-th resource load allocated to the i-th cell with the threshold load.

According to another aspect of the present disclosure, a method for control a connection of a terminal for efficient resource utilization in a base station of a mobile communication system supporting a CA function includes determining whether there is a SCell connection request from a terminal with respect to an i-th cell (herein, i is a positive integer greater than 0 and equal to or smaller than k) corresponding to one of k cells (herein, k is a positive integer greater than 0) in the base station; and if there is the SCell connection request for the i-th cell, determining whether to allow the SCell connection for the i-th cell by comparing an i-th resource load allocated to the i-th cell with a threshold load corresponding to a maximum limit of a resource allocated to each cell.

According to yet another aspect of the present disclosure, an apparatus for control a connection of a terminal for efficient resource utilization in a base station of a mobile communication system supporting a CA function includes a first event detection unit for determining whether there is a PCell connection request from a terminal with respect to an i-th cell (herein, i is a positive integer greater than 0 and equal to or smaller than k) corresponding to one of k cells (herein, k is a positive integer greater than 0) in the base station; a first connection control unit for, if there is the PCell connection request from the terminal, determining whether to allow the PCell connection for the i-th cell of the terminal based on a threshold load corresponding to a maximum limit of a resource allocated to each cell; and a first resource load calculation unit for, under control of the first connection control unit, if the PCell connection for the i-th cell of the terminal is allowed, calculating an i-th resource load allocated to the i-th cell, where the first connection control unit determines whether to release a SCell connection for at least one or more terminals which maintain the SCell connection for the i-th cell by comparing an i-th resource load allocated to the i-th cell with the threshold load.

According to still another aspect of the present disclosure, an apparatus for control a connection of a terminal for efficient resource utilization in a base station of a mobile communication system supporting a CA function includes a second event detection unit for determining whether there is a SCell connection request from a terminal with respect to an i-th cell (herein, i is a positive integer greater than 0 and equal to or smaller than k) corresponding to one of k cells (herein, k is a positive integer greater than 0) in the base station; a second resource load calculation unit for calculating an i-th resource load allocated to the i-th cell; and a second connection control unit for, if there is the SCell connection request for the i-th cell, determining whether to allow the SCell connection for the i-th cell by comparing the i-th resource load calculated by the second resource load calculation unit with a threshold load corresponding to a maximum limit of a resource allocated to each cell.

Effects of the Invention

According to the embodiments of the present disclosure, as the base station which supports a Carrier Aggregation (CA) function performs the connection admission control or a Secondary Cell (SCell) establishment admission control of the CA supporting terminal, the terminal processing resources of the base station can be utilized to maximum without affecting the service performance of the connected terminal. Therefore, the sufficient number of the terminals can be accommodated for the connection up to the available resource limit of the base station and the overload of the base station resource is avoided.

BRIEF DESCRIPTION OF THE DRAWINGS

For a complete understanding of the present disclosure and its effects, the following descriptions are made with reference to the accompanying drawings, where like reference numerals represent like parts.

MODE FOR CARRYING OUT THE INVENTION

FIG. 1 through FIG. 16 used to explain principles of the present disclosure in this patent application are merely exemplary and shall not be construed as limiting the scope of the invention. One of ordinary skilled in the art will appreciate that the principles of the present disclosure can be implemented in any mobile communication system appropriately deployed.

A Carrier Aggregation (CA) technology is a technique for increasing a data rate per terminal by simultaneously transmitting and receiving data between a terminal and a base station over two or more carrier frequencies. To use the CA technology, the base station and the terminal each include the following function. That is, the terminal should include a function for concurrently receiving and/or transmitting data from a plurality of frequencies, and the base station also should include a function for concurrently transmitting and/or receiving data over the plurality of the frequencies supported by the terminal.

Figure 1:
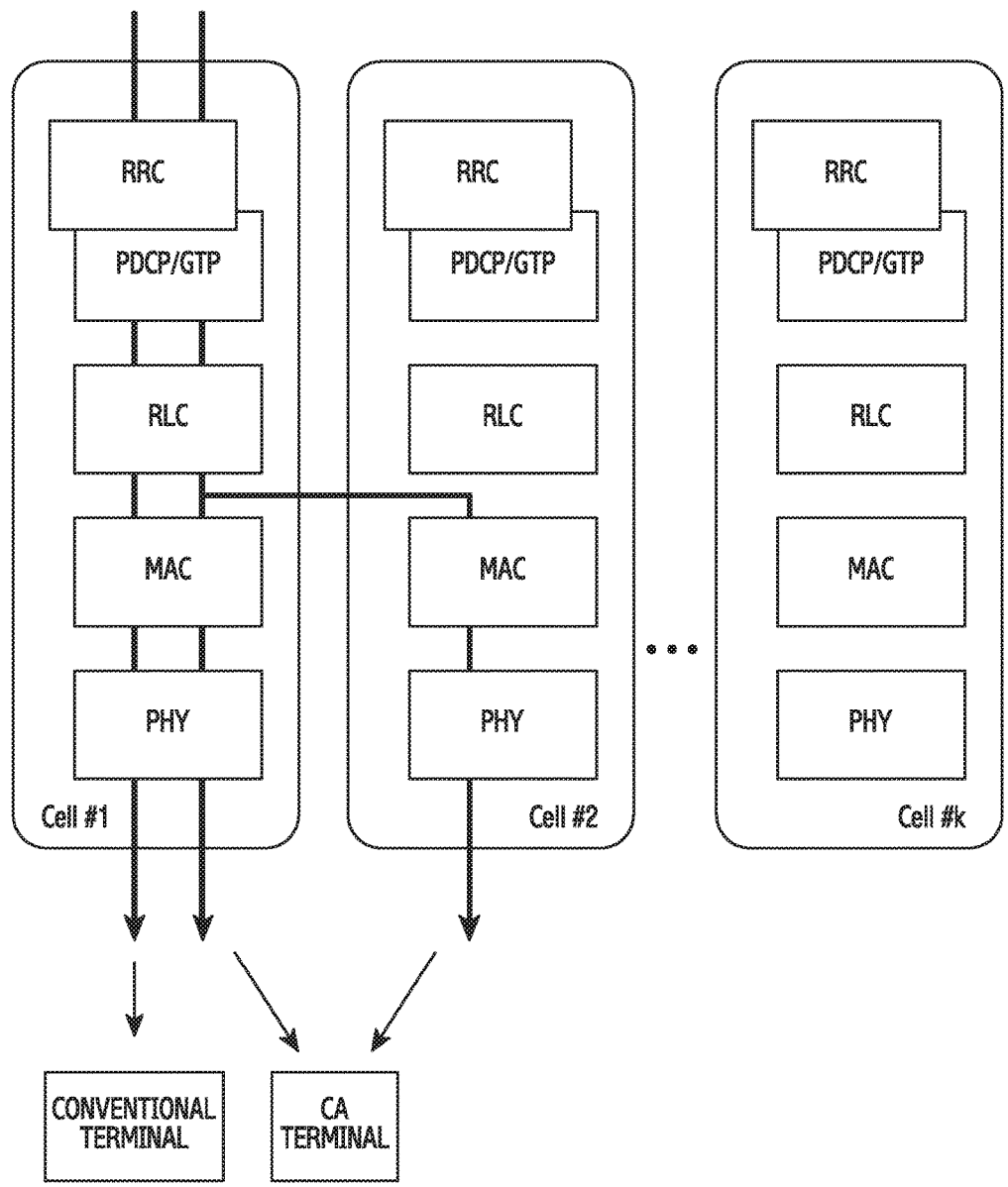
FIG. 1 is a reference diagram for explaining a Carrier Aggregation (CA) function.

FIG. 1 is a reference diagram for explaining a CA function. A terminal not supporting the CA can be serviced through a single frequency and a single cell as in the prior art. Meanwhile, a concurrent data transmission and reception service through a plurality of cells having different carrier frequencies can be provided to a terminal supporting the CA. In other words, the CA supporting terminal can have a plurality of serving cells. The terminal can attempt a connection to one of cells enabling the concurrent service and thus conduct Radio Resource Control connection. A status where an RRC layer and the terminal maintain the connection in the serving cell is referred to as a Primary Cell (PCell) connection, and a status where a MAC/PHY layer and the terminal maintain connection only for the data transmission and reception is referred to as a Secondary Cell (SCell) connection.

Connection process and user context management of the CA terminal and base station processing load taken for higher packet processing are the same as or substantially similar to the processing load for the conventional terminal. Since the CA terminal simultaneously uses Medium Access Control (MAC) layer and Physical (PHY) layer resources of a plurality of cells having different Component Carriers (hereafter, CCs), a resource usage of the MAC layer and PHY layer required to service one CA terminal increases as much as the number of aggregated CCs. For example, the CA terminal in FIG. 1 uses all of the MAC/PHY layer resources of a first cell and a second cell.

Figure 2:
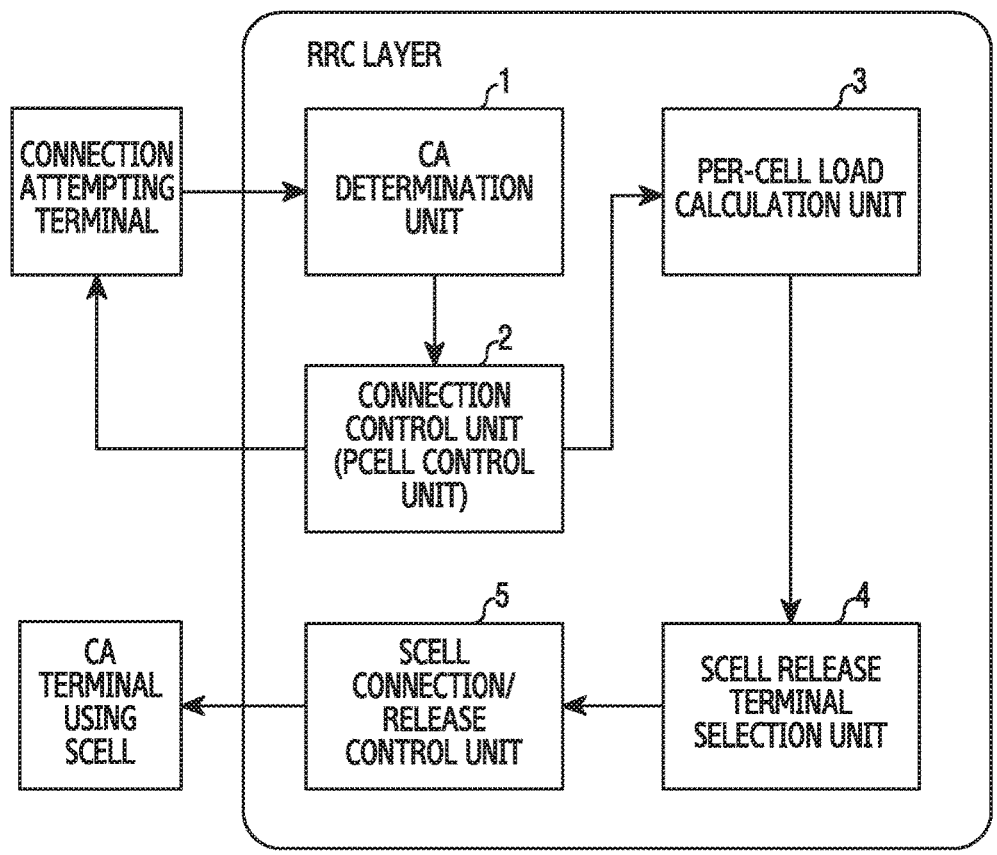
FIG. 2 is a block diagram illustrating configuration of a connection admission control apparatus of a base station in a system supporting CA according to the present disclosure.

FIG. 2 is a block diagram illustrating configuration of a connection admission control apparatus of a base station in a system supporting CA according to the present disclosure. The connection admission control apparatus includes a CA determination unit 1 for determining whether a terminal connecting to a base station is a terminal supporting the CA function, a connection control unit 2 for determining connection admission or rejection of a corresponding terminal and notifying to the terminal, a per-cell load calculation unit 3 for calculating a load per cell of each CC when the connection control unit 2 accepts the connection of the terminal, an SCell release terminal selection unit 4 for selecting a terminal to release when it is necessary to release a connection of the terminal which maintains a previous SCell connection because the load exceeds a certain criterion, and an SCell connection/release control unit 5 for actually releasing the SCell connection.

Figure 3:
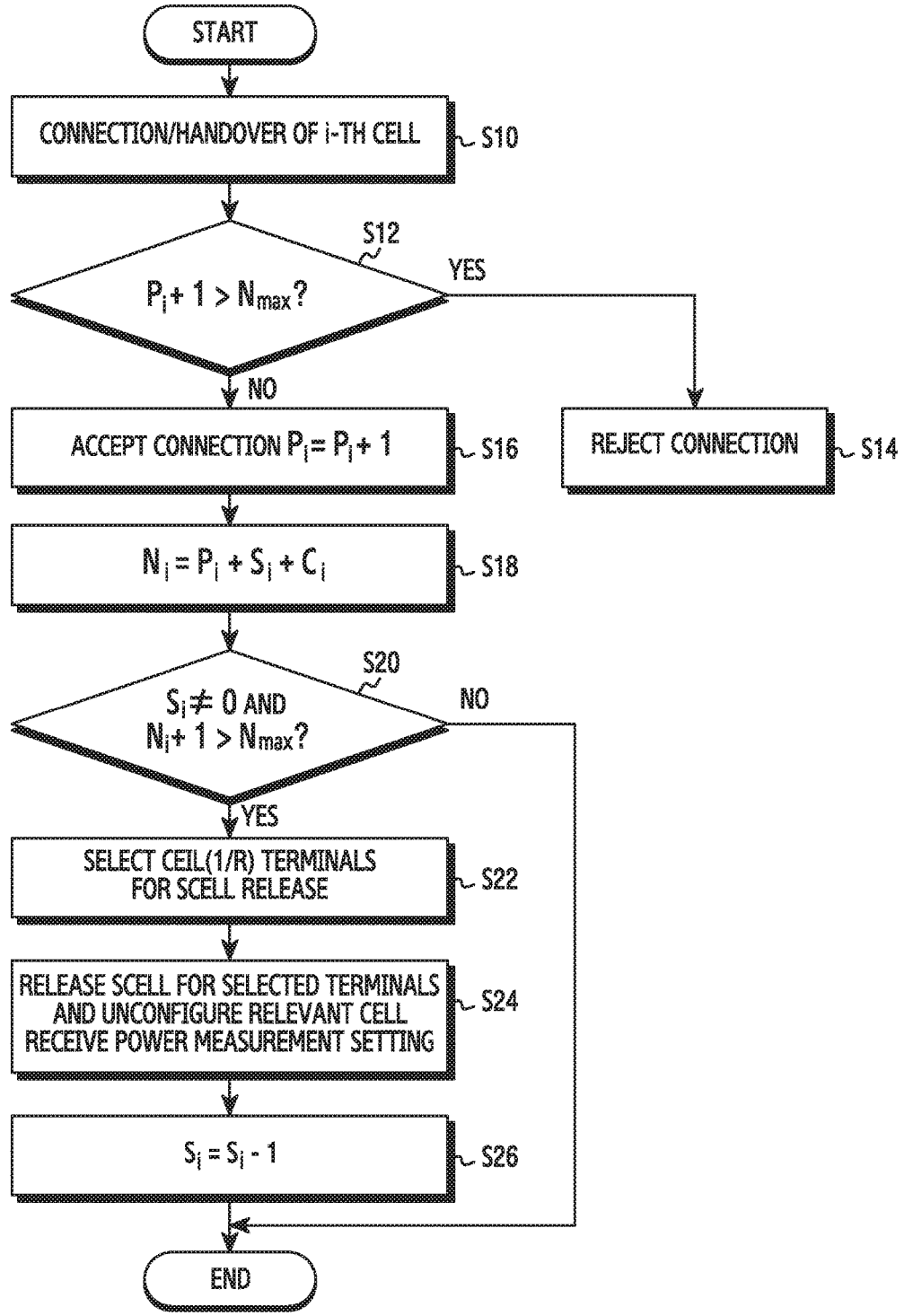
FIG. 3 is a flowchart of an embodiment for explaining connection admission control when a terminal connects to a base station and a terminal enters due to handover.

FIG. 3 is a flowchart of an embodiment for explaining connection admission control when a terminal connects to a base station and a terminal enters due to handover. The connection control of the terminal operates when a terminal connects or enters due to handover.

The CA determination unit 1 checks whether a terminal attempting connection or handover entry to an i-th cell is a CA enabled terminal (S10). Next, the connection control unit determines whether the connection or the handover entry to a PCell is enabled (S12). Herein, $P_i$ denotes the number of terminals which use an i-th serving cell as the PCell provided that there are K cells in the base station, and $N_{max}$ is the maximum allowable number of terminals which can be accommodated by the cell at maximum based on MAC/PHY processing resources.

When $P_i+1>N_{max}$, the connection control unit rejects the requested terminal connection or handover (S14). By contrast, when $P_i+1 \leq N_{max}$, the connection control unit accepts the terminal's connection or handover to the PCell (S16). After the connection admission, $P_i+1$ is regarded as a new $P_i$.

After accepting the connection to the PCell, the per-cell load calculation unit calculates a load per cell in every CC (S18). Provided that there are K cells in the base station, the number of terminals which uses the i-th serving cell as the PCell is $P_i$, and the number of terminals which connects the i-th serving cell as the SCell and uses only MAC/PHY resources is $S_i$, a load $N_i$ of this i-th serving cell can be calculated using the following Equation 1.

$$N_i = P_i + S_i + C_i \quad \text{[Equation 1]}$$

In so doing, $$S_i = r \sum_{j=0}^{K-1} S_{i,j},$$

and $S_{i,j}$ is the number of CA terminals which use the i-th cell as the SCell while connecting to a j-th cell as the PCell. Also, r is a relative ratio of the load when the CA terminal is used as the SCell to the load occupied by one terminal when connecting to a conventional PCell. When r=0 is applied, the SCell use is not considered as part of the load in the same way as a conventional load calculation method. When r=1, it means that the load used as the SCell is equal to the load used to connect the PCell. Also, $C_i$ is a load margin per cell of the i-th cell which can be set to limit the number of SCell using terminals, and $N_{max}$, as mentioned above, is the maximum allowable number of the terminals which can be accommodated by the cell to the maximum based on the MAC/PHY processing resources. $N_{max}$ value can differ at an initial connection of the terminal, at the RRC connection in the idle status, and at the entry due to the handover.

Next, $S_i \neq 0$ and $N_i+1>N_{max}$ are determined (S20).

In S20, when $S_i \neq 0$ and $N_i+1>N_{max}$ are satisfied, the SCell release terminal selection unit selects a terminal which is using the MAC/PHY resource of the cell as the SCell (S22). In so doing, the number of the selected terminals corresponds to Ceil (1/r). Ceil is an operator used in SQL statements, and is the operator which rounds up all of the numbers corresponding to a decimal point. Ceil (1/r) is a rounded-up value of a value corresponding to a reciprocal of r corresponding to the relative ratio of the load with respect to the decimal point.

The SCell release terminal selection unit 4 can use any one of the following five methods as a method for selecting the terminal to release. First, Ceil (1/r)-ary terminals are randomly selected at the point of the SCell release request among terminals of a cell having the smallest number of terminals having the corresponding cell as SCell. Second, Ceil (1/r)-ary terminals are randomly selected at the point of the SCell release request among terminals of a cell having the lowest rate of having the corresponding cell as SCell. Third, Ceil (1/r)-ary terminals are randomly selected at the point of the SCell release request among terminals of a cell having the smallest cell load among PCells covering any terminal having the corresponding cell as the SCell. Herein, the cell load includes one or more of the number of connected terminals, a radio resource use rate, a load of a central processing unit, and a memory usage, and is a load level of processing resources of an eNB. Fourth, a MAC scheduler sequentially selects Ceil (1/r)-ary terminals of the SCell in a descending order of the duration not using the SCell. Fifth, Ceil (1/r)-ary terminals are selected from terminals using the resource as the SCell in a descending order of poor Channel Quality Indicator (CQI).

Next, the selected terminals are SCell released in the PCell RRC-connected by the terminals, and cell received power measurement for the SCell connection is unconfigured (S24). Next, $S_i=S_i+1$ indicating that the terminals connected to the SCell in the corresponding cell are reduced by one is calculated (S26).

Figure 4:
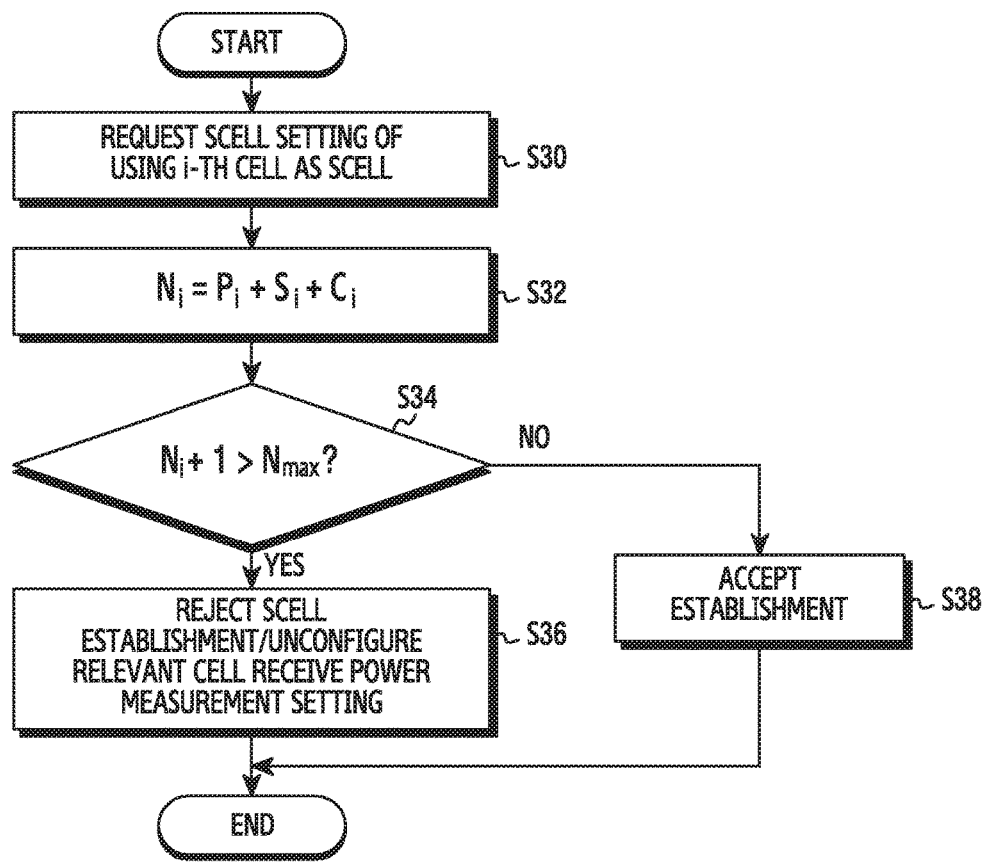
FIG. 4 is a flowchart of an embodiment for explaining admission control when a SCell connection is requested.

FIG. 4 is a flowchart of an embodiment for explaining admission control of a establishment request to a SCell.

Whether SCell establishment for an i-th cell is requested is determined (S30). Whether the establishment is requested is detected as the SCell establishment request when the CA determination unit detects the SCell establishment request in case of the terminal connection or the handover entry, when the terminal transmits a cell receive power, or when excessive traffic elimination of the base station is requested.

When the SCell establishment is requested, the load of the cell which is requested as the SCell is calculated using the aforementioned Equation 1 (S32).

Next, whether the establishment to the SCell is feasible is determined (S34). Whether the establishment to the SCell is feasible is determined by comparing $N_i+1>N_{max}$.

When corresponding to $N_i+1>N_{max}$, the SCell establishment request for the i-th cell is rejected and all of the cell received power measurement for the SCell establishment of the corresponding terminal is unconfigured (S36).

However, when corresponding to $N_i+1 \leq N_{max}$, the SCell establishment request for the i-th cell is accepted and the SCell connection/release control unit performs the SCell receive power measurement (S38).

Figure 5:
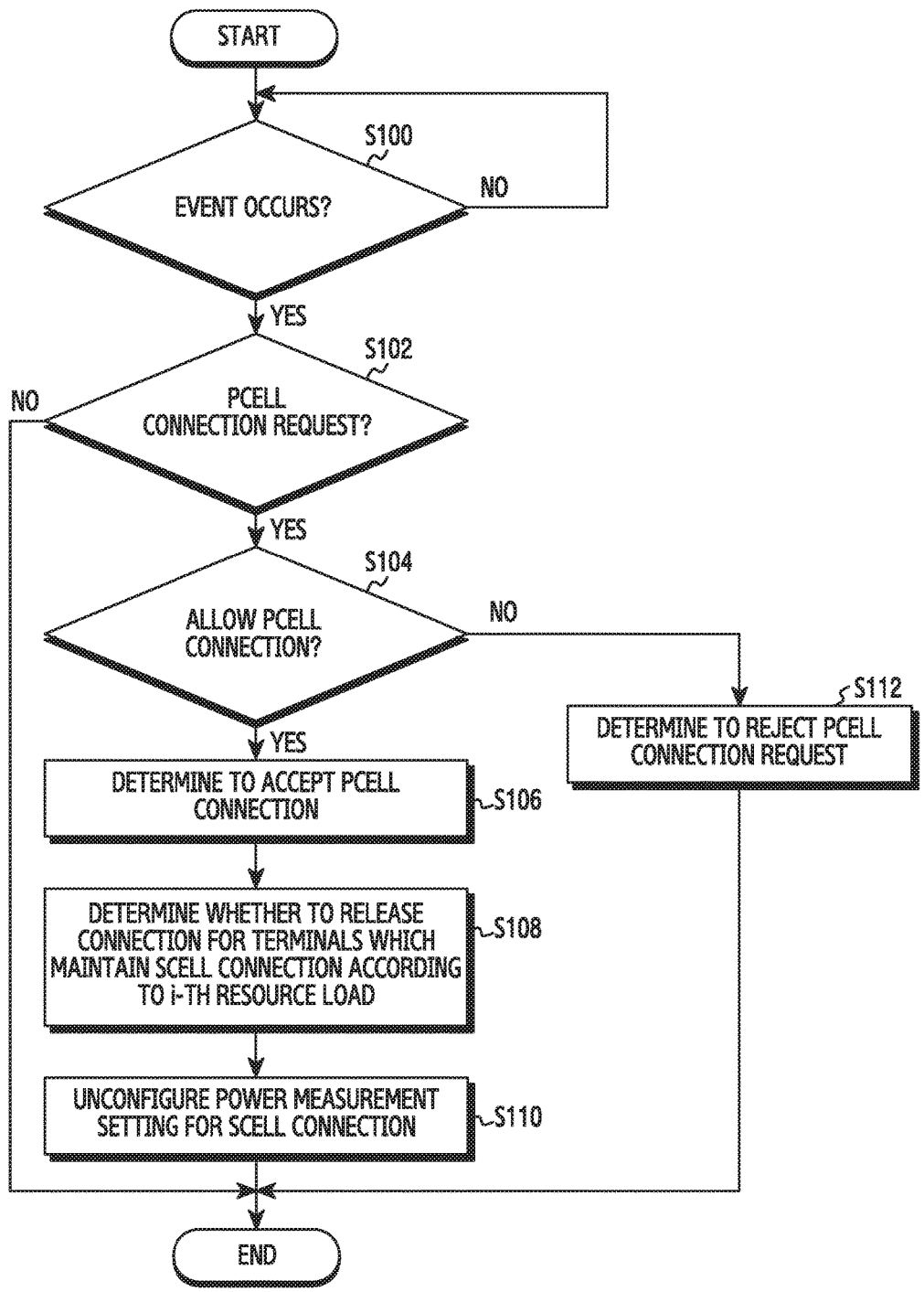
FIG. 5 is a flowchart of an embodiment for explaining a terminal connection control method for efficient resource utilization in a base station according to the present disclosure.

FIG. 5 is a flowchart of an embodiment for explaining a terminal connection control method for efficient resource utilization in a base station according to the present disclosure.

Whether an event occurs is determined (S100). Herein, the event indicates the terminal's connection attempt or handover attempt to the i-th cell.

In S100, when the event occurs, whether to request PCell connection indicating resource use for the RRC layer from a terminal is determined with respect to the i-th (herein, i is a positive integer greater than 0 and equal to or smaller than k) cell corresponding to one of k (herein, k is a positive integer greater than 0) cells in the base station (S102). Whether to request the PCell connection determines as the PCell connection request when the event attempts the connection or the handover to the i-th cell.

In step S102, when there is the PCell connection request from the terminal, whether to allow the PCell connection is determined with respect to the i-th cell of the terminal based on a threshold load corresponding to a maximum limit of a resource allocated to each cell (S104). Herein, the threshold load indicates the maximum number of terminals which can be accommodated to the maximum in each cell based on the processing resource of the MAC/PHY layer. Whether to allow the PCell connection is determined according to whether a value adding one to a previous $P_i$ for the i-th cell, that is, $P_i+1$ exceeds the threshold load $N_{max}$.

In step S104, when the value adding one to the number of the terminals $P_i$ which use the i-th cell as the PCell before the current terminal connects, that is, $P_i+1$ does not exceed the threshold load $N_{max}$, it is determined to accept the PCell connection of the corresponding terminal (S106). That is, when $P_i+1 \leq N_{max}$, the connection or the handover to the PCell for the i-th cell with respect to the terminal is accepted. After the connection acceptance, $P_i+1$ is regarded as a new $P_i$.

After step S106, an i-th resource load allocated to the i-th cell is compared with the threshold load, and thus whether to release the SCell connection is determined with respect to at least one or more terminals which maintain the SCell connection indicating the resource use for the MAC/PHY layer of the i-th cell (S108).

Figure 6:
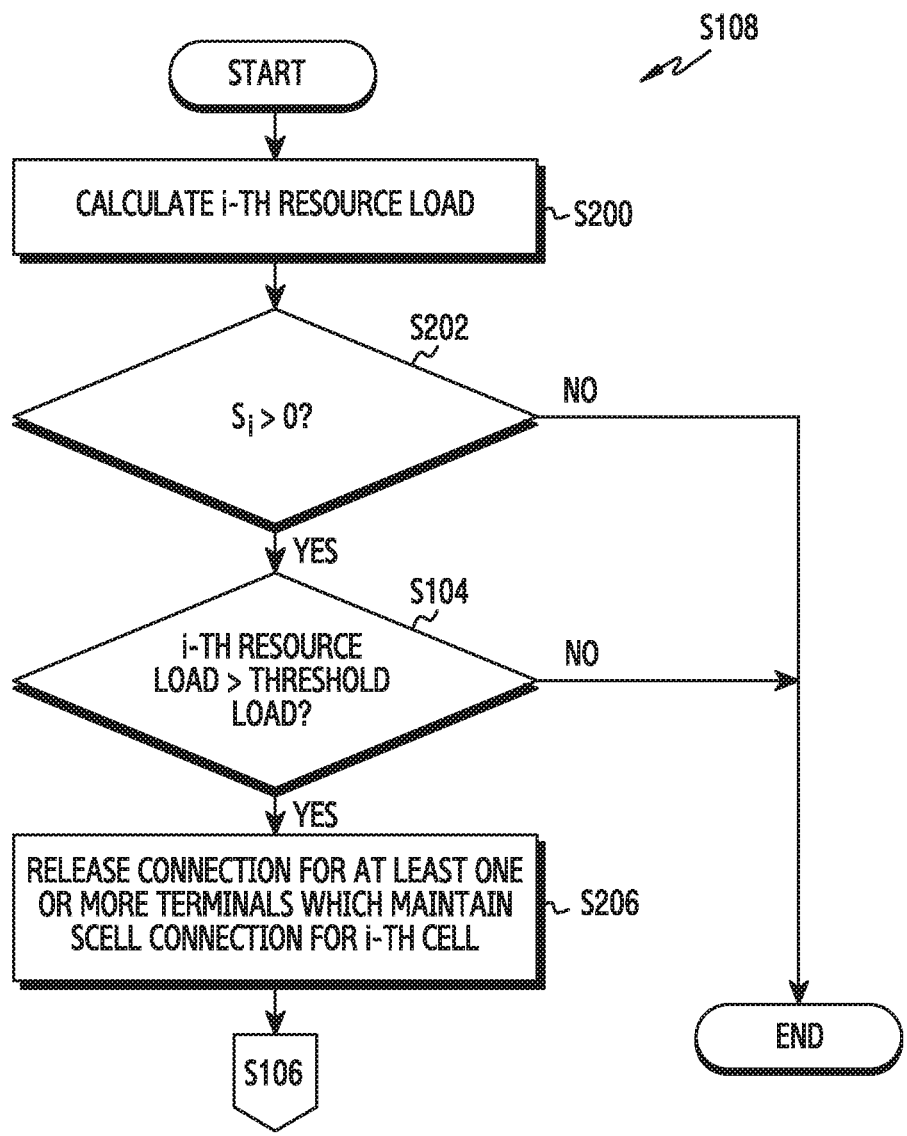
FIG. 6 is a flowchart of an embodiment for explaining a SCell connection release process (S108) for an i-th cell of FIG. 5.

FIG. 6 is a flowchart of an embodiment for explaining the step (S108) for determining whether to release the SCell connection for the i-th cell of FIG. 5.

First, the i-th resource load is calculated (S200). To calculate the i-th resource load, the aforementioned Equation 1 is used. Herein, $N_i$ denotes the i-th resource load, $P_i$ denotes the number of terminals which maintain the PCell connection for the i-th cell, $S_i$ denotes the number of terminals which maintain the SCell connection for the i-th cell, and $C_i$ denotes a resource load margin which can be set to restrict a terminal attempting the SCell connection for the i-th cell. In so doing, $$S_i = r \sum_{j=0}^{K-1} S_{i,j},$$

$S_{i,j}$ is the number of terminals which maintain the SCell connection for the i-th cell while maintaining the PCell connection for a j-th (herein, j is a positive integer greater than 0 and equal to or smaller than k) cell, and r denotes a relative ratio of a resource load of the SCell connection to a resource load occupied by one terminal in the PCell connection.

After step S200, whether there are at least one or more terminals which maintain the SCell connection for the i-th cell is determined (S202). When there is not any terminal which maintains the SCell connection for the i-th cell, the aforementioned process is ended because there are no more terminals to release the SCell connection.

In step S202, when there are at least one or more terminals which maintain the SCell connection for the i-th cell, whether the calculated i-th resource load exceeds the threshold load is determined (S204). Herein, the i-th resource load is the value produced by adding a number 1 to the resource load $N_i$ before the PCell connection of the terminal according to the PCell connection, that is, $N_i+1$, and whether $N_i+1$ exceeds the threshold load $N_{max}$ is determined. When $N_i+1$ does not exceed the threshold load $N_{max}$, it means a spare resource amount of the i-th cell and thus the aforementioned process is ended without releasing the connection for the terminal in the SCell connected state.

However, in step S204, when the calculated i-th resource load exceeds the threshold load, connection of at least one or more terminals which maintain the SCell connection for the i-th cell is released (S206). That is, when $N_1+1$ exceeds the threshold load $N_{max}$, it means no spare resource amount of the i-th cell and accordingly the SCell connection of one or more of the terminals in the SCell connected state is released.

Figure 7:
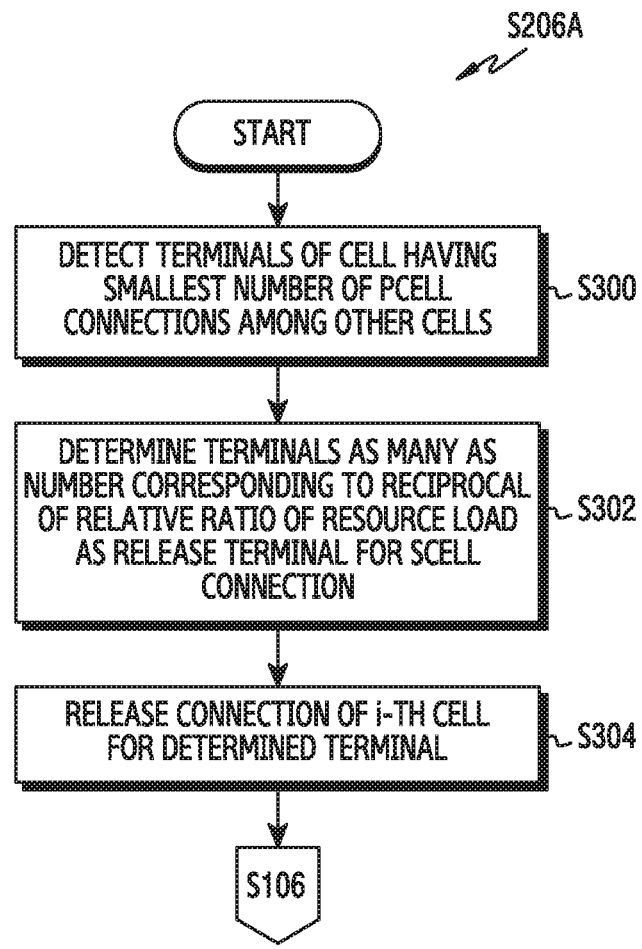
FIG. 7 is a flowchart of an embodiment for explaining connection release (S206) for terminals selected from SCell connected terminals of FIG. 6.

FIG. 7 is a flowchart of an embodiment (S206-A) for explaining the connection release (S206) of the terminal selected from the SCell connected terminals of FIG. 6.

When the terminals which maintain the SCell connection for the i-th cell maintain the PCell connection with other cells respectively, terminals of a cell having the smallest number of the PCell connections are detected from the other cells (S300).

Figure 8:
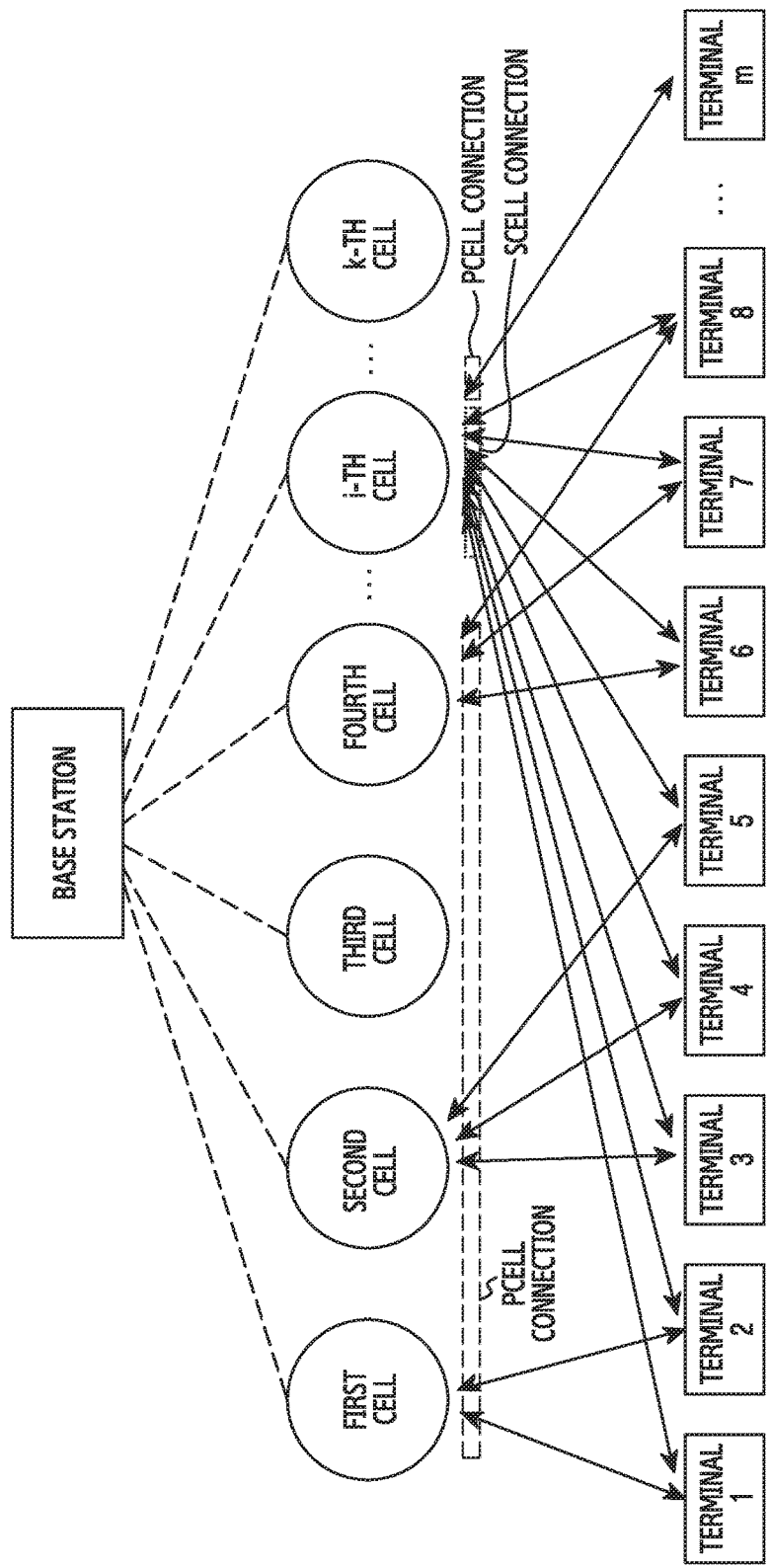
FIG. 8 is a reference diagram for explaining detection of terminals of a cell having the smallest number of PCell connections among other cells.

FIG. 8 is a reference diagram for explaining detection of terminals of a cell having the smallest number of PCell connections among other cells. When each cell of the base station includes a first cell through a k-th cell and terminals connected to the base station include a first terminal through an m-th terminal, it is assumed that the m-th terminal attempts connection to the i-th cell and its PCell connection is allowed. Then, according to the PCell connection for the i-th cell of the m-th terminal, the base station needs to release the connection of one or more of the other terminals connected to the i-th cell, for example, the first terminal through the eighth terminal. In the first terminal through the eighth terminal which maintain the SCell connection for the i-th cell, the first terminal and the second terminal maintain the PCell connection with the first cell, the third terminal, the fourth terminal, and the fifth terminal maintain the PCell connection with the second cell, and the sixth terminal, the seventh terminal, and the eighth terminal maintain the PCell connection with the fourth cell. In so doing, when the number of the PCell connections with the terminals is detected in the first cell, the second cell, and the fourth cell which maintain the PCell connection with the first terminal through the eighth terminal, the first cell has two and the second cell and the fourth cell each have three. Hence, since the cell having the smallest number of the PCell connections with the terminals corresponds to the first cell, the first terminal and the second terminal connected to the first cell are detected as the terminals for the SCell connection release for the i-th cell.

After step S300, the detected terminals as many as a number corresponding to the reciprocal of the relative ratio of the resource load according to the PCell connection and the SCell connection are determined as the terminals for the SCell connection release (S302). The relative ratio r of the resource load is the relative ratio of a load occupied by one terminal having the SCell connection to a load occupied by one terminal having the PCell connection. When r=0 is applied, the SCell use is not considered as part of the load in the same way as the conventional load calculation method. When r=1, it means that the load used as the SCell is equal to the load used to connect the PCell. At this time, Ceil is the operator used in the SQL statements, and is the operator which rounds up all of the numbers corresponding to the decimal point. Hence, the value produced by rounding up the value corresponding to the reciprocal of r corresponding to the relative ratio of the load with respect to the decimal point is determined as the terminal for the SCell connection release. For example, when the value r corresponds to ½, 1/r=2 is corresponded and thus both of the two selected first terminal and second terminal in step 300 are determined as the terminal for the SCell connection release. When the value of 1/r produces 1, any one of the two selected first terminal and second terminal is determined as the terminal for the SCell connection release in step 300.

After step S302, the SCell connection of the i-th cell is released for the determined terminal (S304). The SCell connected state for the i-th cell is released for the release determined terminals.

Figure 9:
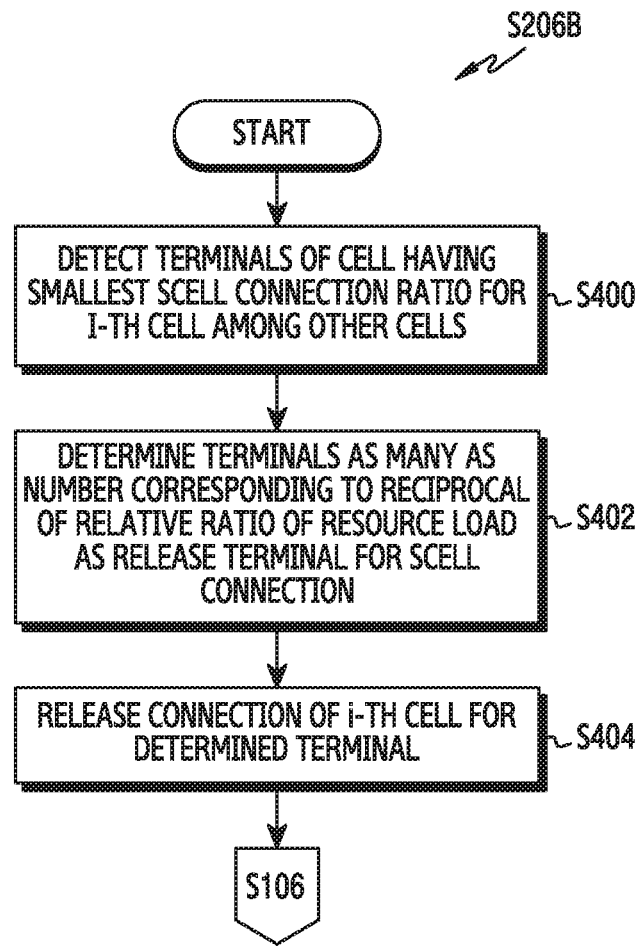
FIG. 9 is a flowchart of another embodiment for explaining connection release (S206) for terminals selected from SCell connected terminals of FIG. 6.

FIG. 9 is a flowchart of another embodiment (S206-B) for explaining the connection release (S206) of the terminals selected from the SCell connected terminals of FIG. 6.

When the terminals which maintain the SCell connection for the i-th cell maintain the PCell connection with other cells respectively, terminals of a cell having the smallest SCell connection ratio are detected from the other cells (S400).

Referring to FIG. 8, in the first terminal through the eighth terminal which maintain the SCell connection for the i-th cell, the first terminal and the second terminal maintain the PCell connection with the first cell, the third terminal, the fourth terminal, and the fifth terminal maintain the PCell connection with the second cell, and the sixth terminal, the seventh terminal, and the eighth terminal maintain the PCell connection with the fourth cell. In so doing, the cells which maintain the PCell connection with the first terminal through the eighth terminal are the first cell, the second cell, and the fourth cell. However, the first cell, the second cell, and the fourth cell each can have the SCell connection for other cells besides the SCell connection for the i-th cell. In so doing, the cell having the smallest connection ratio is detected by comparing the SCell connection ratio for the i-th cell with the SCell connection ratio for the other cells in the first cell, the second cell, and the fourth cell respectively. When the cell having the smallest SCell connection ratio for the i-th cell corresponds to the first cell, the first terminal and the second terminal connected to the first cell are detected as the terminals to release the SCell connection for the i-th cell.

After step S400, the detected terminals as many as a number corresponding to the reciprocal of the relative ratio of the resource load according to the PCell connection and the SCell connection are determined as the terminals for the SCell connection release (S402). Step S402 is the same as the aforementioned step S302 and thus its detailed descriptions are omitted.

After step S402, the SCell connection of the i-th cell is released for the determined terminal (S404). Step S404 is the same as the aforementioned step S304 and thus its detailed descriptions are omitted.

Figure 10:
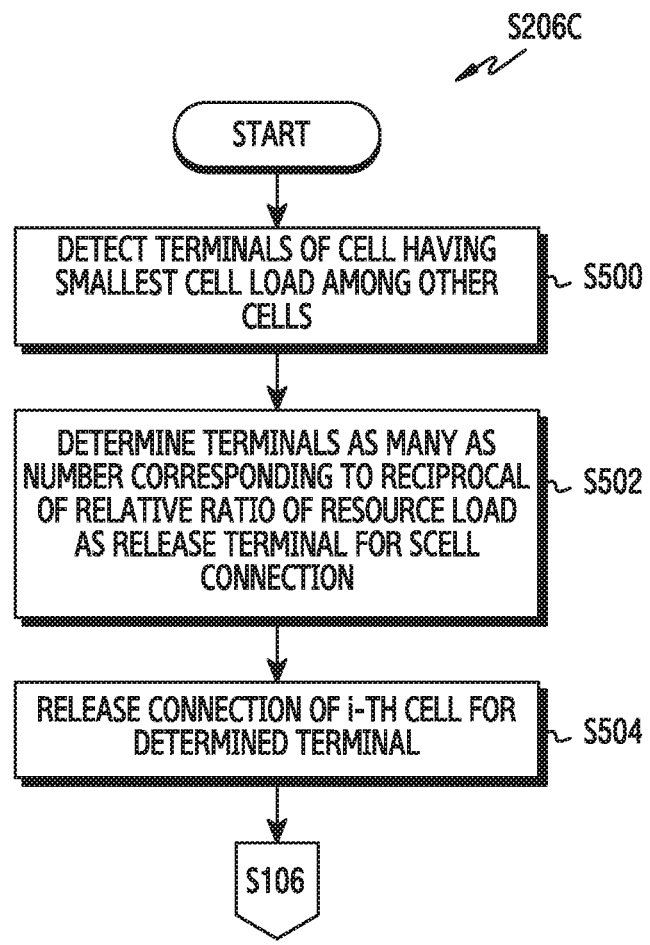
FIG. 10 is a flowchart of another embodiment for explaining connection release (S206) of terminals selected from SCell connected terminals of FIG. 6.

FIG. 10 is a flowchart of another embodiment (S206-C) for explaining the connection release (S206) of the terminals selected from the terminals connected to the SCell of FIG. 6.

When the terminals which maintain the SCell connection for the i-th cell maintain the PCell connection with other cells respectively, terminals of a cell having the smallest cell load are detected from the other cells (S500). Herein, the cell load corresponds to one or more values of the number of the connected terminals, the radio resource use rate, the load of the central processing unit, and the memory usage.

Referring to FIG. 8, in the first terminal through the eighth terminal which maintain the SCell connection for the i-th cell, the first terminal and the second terminal maintain the PCell connection with the first cell, the third terminal, the fourth terminal, and the fifth terminal maintain the PCell connection with the second cell, and the sixth terminal, the seventh terminal, and the eighth terminal maintain the PCell connection with the fourth cell. In so doing, the cells which maintain the PCell connection with the first terminal through the eighth terminal are the first cell, the second cell, and the fourth cell. However, the first cell, the second cell, and the fourth cell each can have the load due to the allocation such as resource required for the serving. When such a load is the cell load, the cell having the smallest cell load is detected from the first cell, the second cell, or the fourth cell. When the cell having the smallest cell load among the first cell, the second cell, and the fourth cell corresponds to the first cell, the first terminal and the second terminal connected to the first cell are detected as the terminals to release the SCell connection for the i-th cell.

After step S500, the detected terminals as many as a number corresponding to the reciprocal of the relative ratio of the resource load according to the PCell connection and the SCell connection are determined as the terminals for the SCell connection release (S502). Step S502 is the same as the aforementioned step S302 and thus its detailed descriptions are omitted.

After step S502, the SCell connection of the i-th cell is released for the determined terminal (S504). Step S504 is the same as the aforementioned step S304 and thus its detailed descriptions are omitted.

Figure 11:
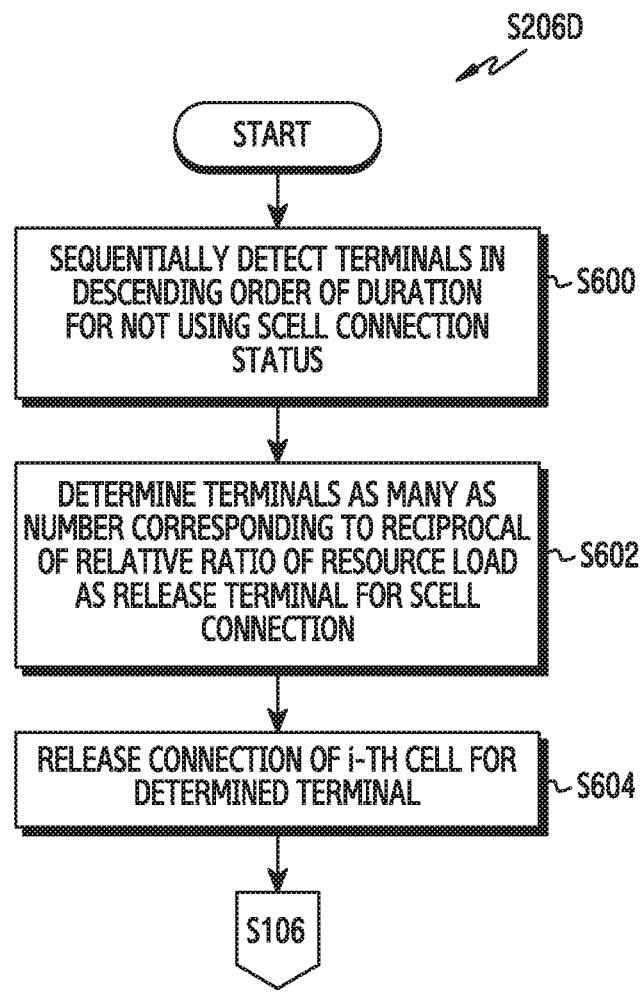
FIG. 11 is a flowchart of another embodiment for explaining connection release (S206) of terminals selected from SCell connected terminals of FIG. 6.

FIG. 11 is a flowchart of another embodiment (S206-D) for explaining the connection release (S206) of the terminals selected from the SCell connected terminals of FIG. 6.

Among the terminals which maintain the SCell connection for the i-th cell, terminals are sequentially detected in descending order of a duration for not using the SCell connected state (S600).

Referring to FIG. 8, among the first terminal through the eighth terminal which maintain the SCell connection for the i-th cell, terminals of the longest duration for not using a service such as data exchange between the i-th cell and the terminal according to the SCell connection are sequentially detected. Information about the duration of not using the connected state is provided through a scheduler. For example, when the terminals of the longest duration for not using the connected state are the first terminal and the second terminal in order, the first terminal and the second terminal are detected as the terminals for the SCell connection release for the i-th cell in such an order.

After step S600, the detected terminals as many as a number corresponding to the reciprocal of the relative ratio of the resource load according to the PCell connection and the SCell connection are determined as the terminals for the SCell connection release (S602). Step S602 is the same as the aforementioned step S302 and thus its detailed descriptions are omitted.

After step S602, the SCell connection of the i-th cell is released for the determined terminal is released (S604). Step S604 is the same as the aforementioned step S304 and thus its detailed descriptions are omitted.

Figure 12:
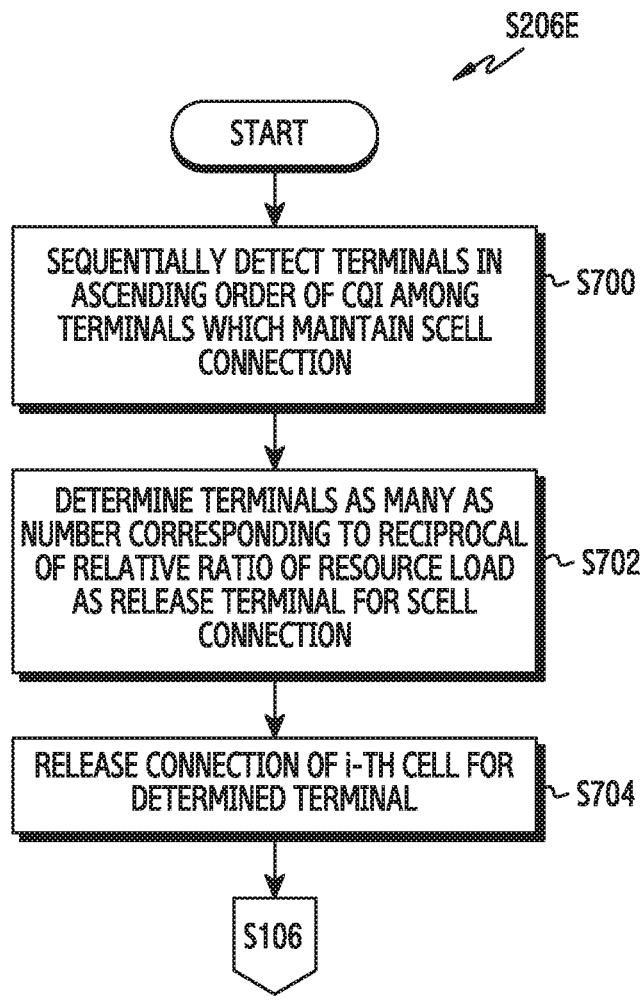
FIG. 12 is a flowchart of another embodiment for explaining connection release (S206) of terminals selected from SCell connected terminals of FIG. 6.

FIG. 12 is a flowchart of another embodiment (S206-E) for explaining the connection release (S206) of the terminals selected from the SCell connected terminals of FIG. 6.

Among the terminals which maintain the SCell connection for the i-th cell, terminals sequentially detected in ascending order of CQI (S700). The CQI indicates a radio channel quality for the terminal, and is an indicator measured by the terminal and transmitted to the base station.

Referring to FIG. 8, among the first terminal through the eighth terminal which maintain the SCell connection for the i-th cell, terminals of the lowest CQI are sequentially detected. The CQI is provided from the first terminal through the eighth terminal respectively. For example, when the terminals of the lowest CQI are the first terminal and the second terminal in order, the first terminal and the second terminal are detected as the terminals for the SCell connection release for the i-th cell in such an order.

After step S700, the detected terminals as many as a number corresponding to the reciprocal of the relative ratio of the resource load according to the PCell connection and the SCell connection are determined as the terminals for the SCell connection release (S702). Step S702 is the same as the aforementioned step S302 and thus its detailed descriptions are omitted.

After step S702, the SCell connection of the i-th cell is released for the determined terminal (S704). Step S704 is the same as the aforementioned step S304 and thus its detailed descriptions are omitted.

After step S108, the setting regarding the power management for the SCell connection is unconfigured (S110). As the i-th cell does not have resources for allowing the SCell connection, to block an additional SCell connection request, the setting for measuring and reporting the power from the terminal is unconfigured.

Meanwhile, in step S104, when the PCell connection of the terminal for the i-th cell is not allowed, it is determine to reject the PCell connection request of the terminal for the i-th cell (S112). When the value adding one more terminal currently attempting the connection to the number of the terminals $P_i$ which use the i-th cell as the PCell, that is, $P_i+1$ exceeds the threshold load $N_{max}$, the i-th cell does not have resources for the PCell connection any more. Hence, in this case, it is determine to reject the PCell connection request of the terminal for the i-th cell.

Figure 13:
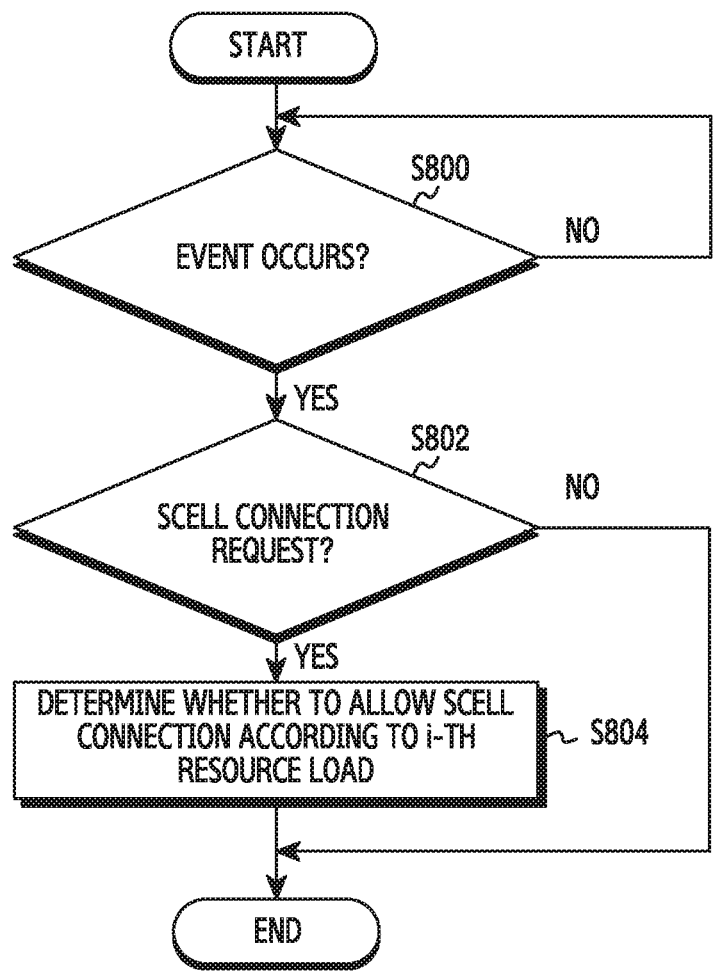
FIG. 13 is a flowchart of another embodiment for explaining a terminal connection control method for efficient resource utilization in a base station according to the present disclosure.

FIG. 13 is a flowchart of another embodiment for explaining a terminal connection control method for efficient resource utilization in a base station according to the present disclosure.

Whether an event occurs is determined (S800). The event occurrence is determined when the terminal attempts connection or handover to the i-th cell, when power information of the i-th cell is received from the terminal, or when the base station itself determines traffic excess over a certain level.

In S800, when the event occurs, whether there is a connection request for SCell connection indicating resource use of the MAC/PHY layer of the i-th (herein, i is a positive integer greater than 0 and equal to or smaller than k) cell corresponding to one of k (herein, k is a positive integer greater than 0) cells in the base station (S802). The SCell connection request is determined when the terminal attempts the connection or the handover to the i-th cell, when the power information of the i-th cell is received from the terminal, or when the base station itself determines traffic excess over a certain level. When there is no SCell connection request, the aforementioned process is ended.

However, in S800, when there is the SCell connection request for the i-th cell, whether to allow the SCell connection for the i-th cell is determined by comparing the i-th resource load allocated to the i-th cell with a threshold load corresponding to a maximum limit of the resource allocated to each cell (S804).

Figure 14:
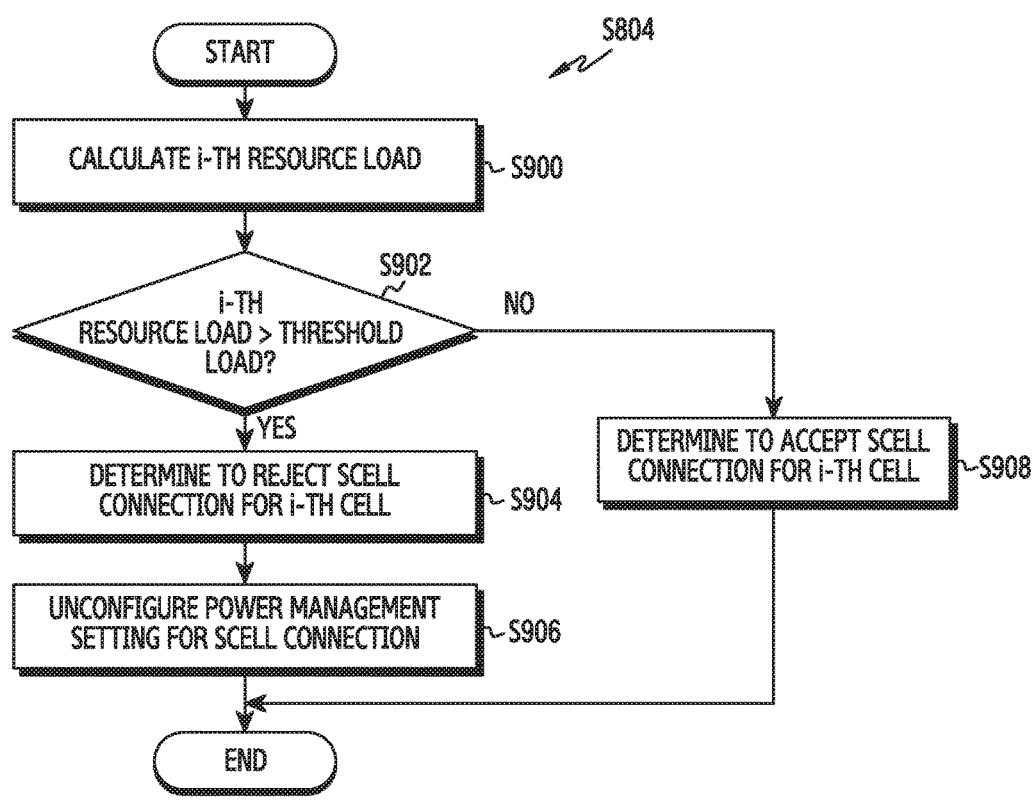
FIG. 14 is a flowchart of an embodiment for explaining a process for determining whether to allow SCell connection for an i-th cell FIG. 13.

FIG. 14 is a flowchart of an embodiment for explaining a process for determining whether to allow SCell connection of an i-th cell FIG. 13.

The i-th resource load is calculated (S900). The i-th resource load is calculated using the aforementioned Equation 1. Herein, $N_i$ denotes the i-th resource load, $P_i$ denotes the number of the terminals which maintain the PCell connection for the i-th cell indicating the resource use for the RRC layer of the i-th cell, $S_i$ denotes the number of the terminals which maintain the PCell connection for the i-th cell, and $C_i$ denotes the resource load margin which can be set to restrict the terminal attempting the SCell connection for the i-th cell. In so doing, $$S_i = r\sum_{j=0}^{K-1} S_{i,j},$$

$S_{i,j}$ is the number of the terminals which maintain the SCell connection for the i-th cell while maintaining the PCell connection for the j-th (herein, j is a positive integer greater than 0 and equal to or smaller than k) cell, and r denotes the relative ratio of the resource load of the SCell connection to the resource load occupied by one terminal in the PCell connection.

After step S900, whether the calculated i-th resource load exceeds the threshold load corresponding to the maximum limit of the resource allocated to each cell is determined (S902). Herein, the i-th resource load is the value produced by adding the number 1 to the resource load $N_i$ before the PCell connection of the terminal according to the PCell connection, that is, $N_i+1$, and whether $N_i+1$ exceeds the threshold load $N_{max}$ is determined.

In step S902, when the calculated i-th resource load exceeds the threshold load, it is determine to reject the SCell connection establishment request of the terminal for the i-th cell (S904). That is, $N_i+1$ exceeding the threshold load $N_{max}$ means that there is no spare resource of the i-th resource. That is, since it means that the resource of the i-th cell corresponds to the status not additionally allowing the SCell connection, the SCell connection establishment request is determined to reject.

After step S904, the setting regarding the power management for the SCell connection is unconfigured (S906). As the i-th cell does not have resources for allowing the SCell connection, in order to block an additional SCell connection request, the setting for measuring and reporting the power from the terminal is unconfigured.

Meanwhile, in step S902, when the calculated i-th resource load does not exceed the threshold load, it is determine to allow the SCell connection request for the i-th cell (S908). When $N_i+1$ does not exceed the threshold load $N_{max}$, it means that there is a spare resource of the i-th cell and thus the SCell connection request for the i-th cell is determined to allow.

Figure 15:
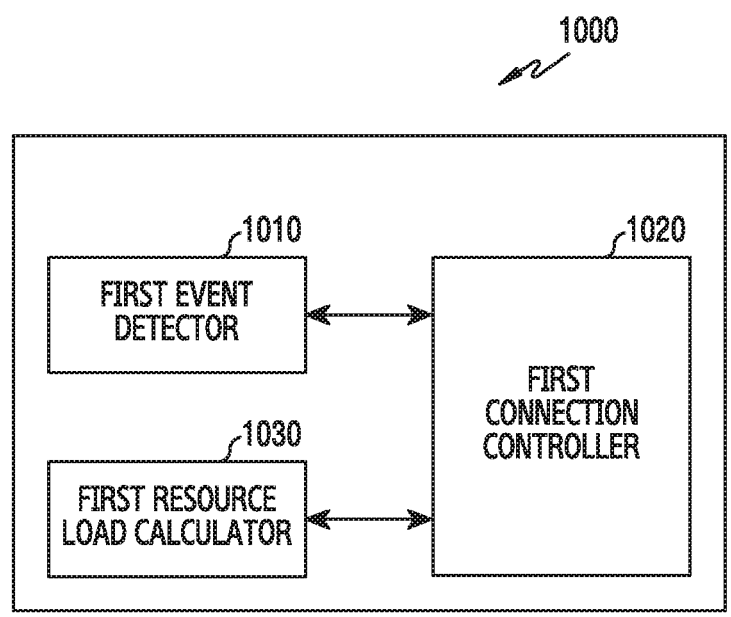
FIG. 15 is a block diagram of an embodiment for explaining a terminal connection control apparatus for efficient resource utilization in a base station according to the present disclosure.

FIG. 15 is a block diagram of an embodiment for explaining a terminal connection control apparatus 1000 for efficient resource utilization in a base station according to the present disclosure, and includes a first event detector 1010, a first connection controller 1020, and a first resource load calculator 1030.

The first event detector 1010 detects the event occurrence. The first event detector 1010 detects the connection attempt or the handover attempt for the i-th cell of the terminal, as the event. When the event occurs, the first event detector 1010 detects whether there is a PCell connection request for the i-th cell of the base station, and sends a detected signal to the first connection controller 1020.

When receiving the signal indicating the PCell connection request from the first event detector 1010, the first connection controller 1020 determines whether to allow the PCell connection for the i-th cell of the terminal based on the threshold load corresponding to the maximum limit of the resource allocated to each cell, and sends a determined signal to the first resource load calculator 1030. Herein, the threshold load indicates the maximum number of terminals which can be accommodated to the maximum in each cell based on the processing resource of the MAC/PHY layer. The first connection controller 1020 determines whether to allow the PCell connection according to whether the value adding one more to the previous $P_i$ for the i-th cell, that is, $P_i+1$ exceeds the threshold load $N_{max}$.

When the value adding one to the number of the terminals $P_i$ which use the i-th cell as the PCell before the current terminal connects, that is, $P_i+1$ does not exceed the threshold load $N_{max}$, the first connection controller 1020 determines to allow the connection or the handover of the corresponding terminal.

When receiving the determination signal for allowing the PCell connection for the i-the cell of the terminal from the first connection controller 1020, the first resource load calculator 1030 calculates the i-th resource load allocated to the CC of the i-th cell and sends a calculation signal to the first connection controller 1020. The first resource load calculator 1030 calculates the i-th resource load based on the aforementioned Equation 1. Herein, $N_i$ denotes the i-th resource load, $P_i$ denotes the number of the terminals which maintain the PCell connection for the i-th cell, $S_i$ denotes the number of the terminals which maintain the SCell connection for the i-th cell, and $C_i$ denotes the resource load margin which can be set to restrict the terminal attempting the SCell connection for the i-th cell. In so doing, $$S_i = r \sum_{j=0}^{K-1} S_{i,j},$$

$S_{i,j}$ is the number of the terminals which maintain the SCell connection for the i-th cell while maintaining the PCell connection for the j-th (herein, j is a positive integer greater than 0 and equal to or smaller than k) cell, and r denotes the relative ratio of the resource load in the SCell connection to the resource load occupied by one terminal in the PCell connection.

Hence, the first connection controller 1020 releases the SCell connection for at least one or more terminals which maintain the SCell connection indicating the resource use for the MAC/PHY layer of the i-th cell according to the calculated i-th resource load.

The first connection controller 1020 detects whether the number of the terminals which maintain the SCell connection for the i-th cell is at least one or more. When the number of the terminals which maintain the SCell connection for the i-th cell is at least one or more, the first connection controller 1020 determines whether the calculated i-th resource load exceeds the threshold load). The first connection controller 1020 determines whether the number adding one to the previous resource load $N_i$ according to the PCell connection, that is, $N_i+1$ exceeds the threshold load $N_{max}$. When $N_i+1$ does not exceed the threshold load $N_{max}$, it means the spare resource of the i-th cell and thus the first connection controller 1020 terminates the aforementioned process without releasing the connection for the terminal in the SCell connected state.

However, when the calculated i-th resource load exceeds the threshold load, it means no spare resource of the i-th cell and thus the first connection controller 1020 releases the SCell connection for one or more of the terminals in the SCell connected state.

The first connection controller 1020 can exemplify five methods as a method for detecting the terminal to release among the SCell connected terminals.

As the first method, when the terminals maintaining the SCell connection for the i-th cell retain the PCell connection with other cells respectively, the first connection controller 1020 detects terminals of the cell having the smallest number of the PCell connections among the other cells. Referring to FIG. 8 as stated earlier, in the first terminal through the eighth terminal which maintain the SCell connection for the i-th cell, the first terminal and the second terminal maintain the PCell connection with the first cell, the third terminal, the fourth terminal, and the fifth terminal maintain the PCell connection with the second cell, and the sixth terminal, the seventh terminal, and the eighth terminal maintain the PCell connection with the fourth cell. In so doing, among the first cell, the second cell, and the fourth cell which maintain the PCell connection with the first terminal through the eighth terminal, when the number of the PCell connections with the terminals is detected, the first cell has two and the second cell and the fourth cell each have three. Hence, since the cell having the smallest number of the PCell connections with the terminals corresponds to the first cell, the first connection controller 1020 detects the first terminal and the second terminal connected to the first cell as the terminals for the SCell connection release for the i-th cell.

As the second method, when the terminals which maintain the SCell connection for the i-th cell maintain the PCell connection with other cells respectively, the first connection controller 1020 detects the terminals of the cell having the smallest ratio of the SCell connections for the i-th cell among the other cells. Referring to FIG. 8, the cells which maintain the PCell connection with the first terminal through the eighth terminal are the first cell, the second cell, and the fourth cell. However, the first cell, the second cell, and the fourth cell each can have the SCell connection for the other cells besides the SCell connection for the i-th cell. The first connection controller 1020 detects the cell having the smallest connection ratio by comparing the SCell connection ratio for the i-th cell with the SCell connection ratio for the other cells in the first cell, the second cell, and the fourth cell respectively. Hence, when the cell having the smallest SCell connection ratio for the i-th cell corresponds to the first cell, the first connection controller 1020 detects the first terminal and the second terminal connected to the first cell as the terminals to release the SCell connection for the i-th cell.

As the third method, when the terminals which maintain the SCell connection for the i-th cell maintain the PCell connection with other cells respectively, the first connection controller 1020 detects the terminals of the cell having the smallest cell load among the other cells. As the cell load, the first connection controller 1020 checks the values relating to the number of the connected terminals for each cell, the radio resource use rate, the load of the central processing unit, and the memory usage. Referring to FIG. 8, the cells which maintain the PCell connection with the first terminal through the eighth terminal are the first cell, the second cell, and the fourth cell. However, the first cell, the second cell, and the fourth cell each have the load due to the allocation such as resource required for the serving. When such a load is the cell load, the first connection controller 1020 detects the cell having the smallest cell load among the first cell, the second cell, or the fourth cell. When the cell having the smallest cell load among the first cell, the second cell, and the fourth cell corresponds to the first cell, the first connection controller 1020 detects the first terminal and the second terminal connected to the first cell as the terminals to release the SCell connection for the i-th cell.

As the fourth method, the first connection controller 1020 sequentially detects the terminals of the longest duration for not using the SCell connected state among the terminals which maintain the SCell connection for the i-th cell. Referring to FIG. 8, among the first terminal through the eighth terminal which maintain the SCell connection for the i-th cell, the terminals of the longest duration for not using the service such as data exchange between the i-th cell and the terminal according to the SCell connection are sequentially detected. The first connection controller 1020 receives the information about the duration for not using the connected state through the scheduler (not shown). For example, when the terminals of the longest duration for not using the connected state are the first terminal and the second terminal in order, the first connection controller 1020 detects the first terminal and the second terminal as the terminals for the SCell connection release for the i-th cell in such an order.

As the fifth method, the first connection controller 1020 sequentially detects the terminals having the lowest CQI among the terminals which maintain the SCell connection for the i-th cell. The CQI indicates the radio channel quality for the terminal, and is the indicator measured by the terminal and transmitted to the base station. Referring to FIG. 8, among the first terminal through the eighth terminal which maintain the SCell connection for the i-th cell, the terminals of the lowest CQI are sequentially detected. The CQI is provided from the first terminal through the eighth terminal respectively. For example, when the terminals of the lowest CQI are the first terminal and the second terminal in order, the first connection controller 1020 detects the first terminal and the second terminal as the terminals for the SCell connection release for the i-th cell in such an order.

Next, the first connection controller 1020 determines the terminals as many as a number corresponding to the reciprocal of the relative ratio of the resource load according to the PCell connection and the SCell connection among the terminals detected using an one of the five methods, as the terminals for the SCell connection release. The relative ratio r of the resource load is the relative ratio of a load occupied by one terminal having the SCell connection to a load occupied by one terminal having the PCell connection. The first connection controller 1020 determines Ceil (1/r)-ary terminals as the terminals for the SCell connection release. That is, the first connection controller 1020 determines the rounded-up value of the value corresponding to the reciprocal of r corresponding to the relative ratio of the load with respect to the decimal point, as the terminals for the SCell connection release.

Next, the first connection controller 1020 releases the SCell connection of the i-th cell for the determined terminal. The first connection controller 1020 releases the SCell connected state for the i-th cell with respect to the terminal determined to release.

Next, the first connection controller 1020 unconfigures the setting for the power management for the SCell connection (S110). As the i-th cell does not have any more resources for allowing the SCell connection, to block an additional SCell connection request, the first connection controller 1020 unconfigures the setting for measuring and reporting the power from the terminal.

Meanwhile, when the PCell connection of the terminal for the i-th cell is not allowed, the first connection controller 1020 determines to reject the PCell connection request of the terminal for the i-th cell. When the value adding one more terminal currently attempting the connection to the number of the terminals $P_i$ which use the i-th cell as the PCell, that is, $P_i+1$ exceeds the threshold load $N_{max}$, the i-th cell does not have any more resources for the PCell connection and accordingly, the first connection controller 1020 determines to reject the PCell connection request of the terminal for the i-th cell.

Figure 16:
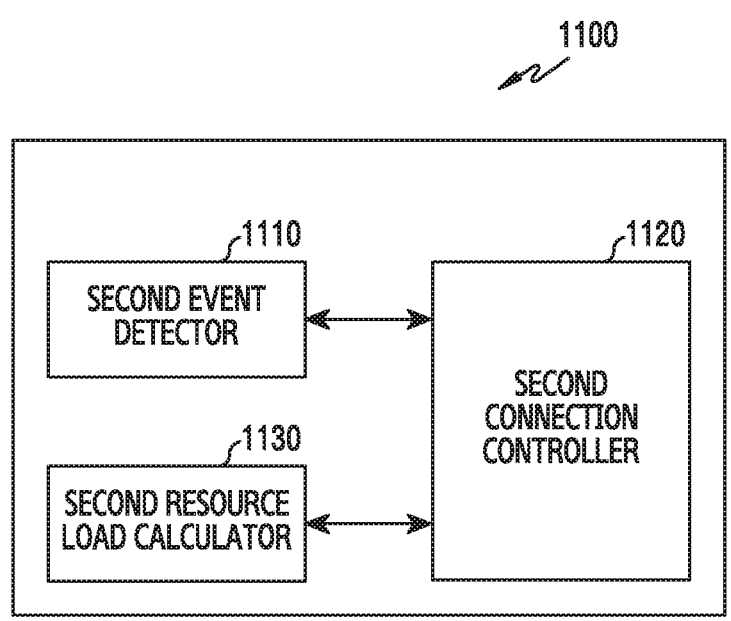
FIG. 16 is a block diagram of another embodiment for explaining a terminal connection control apparatus for efficient resource utilization in a base station according to the present disclosure.

FIG. 16 is a block diagram of another embodiment for explaining a terminal connection control apparatus 1100 for efficient resource utilization in a base station according to the present disclosure, and includes a second event detector 1110, a second connection controller 1120, and a second resource load calculator 1130.

The second event detector 1110 detects the event occurrence. As the event, the second event detector 1110 determines the event occurrence when the terminal attempts the connection or the handover to the i-th cell, when the power information of the i-th cell is received from the terminal, or when the base station itself determines traffic excess over a certain level.

When the event occurs, the second event detector 1110 detects whether there is the SCell connection request indicating the resource use for the MAC/PHY layer of the i-th cell of the base station, and sends a detected signal to the second connection controller 1120.

The second connection controller 1120 directs to calculate the resource load of the second resource load calculator 1130 according to the SCell connection request.

Under control of the second connection controller 1120, the second resource load calculator 1130 calculates the i-th resource load allocated to the CC of the i-th cell and sends a calculated signal to the second connection controller 1120. The second resource load calculator 1130 calculates the i-th resource load based on the aforementioned Equation 1. Herein, $N_i$ denotes the i-th resource load, $P_i$ denotes the number of the terminals which maintain the PCell connection indicating the resource use for the RRC layer of the i-th cell, $S_i$ denotes the number of the terminals which maintain the SCell connection for the i-th cell, and $C_i$ denotes the resource load margin which can be set to restrict the terminal attempting the SCell connection for the i-th cell. In so doing, $$S_i = r \sum_{j=0}^{K-1} S_{i,j},$$

$S_{i,j}$ is the number of the terminals which maintain the SCell connection for the i-th cell while maintaining the PCell connection for the j-th (herein, j is a positive integer greater than 0 and equal to or smaller than k) cell, and r denotes the relative ratio of the resource load in the SCell connection to the resource load occupied by one terminal in the PCell connection.

According to the i-th resource load calculated by the second resource load calculator 1130, the second connection controller 1120 determines whether to allow the SCell connection establishment for the i-th cell.

The second connection controller 1120 determines whether the calculated i-th resource load exceeds the threshold load corresponding to the maximum limit of the resource allocated to each cell. The second connection controller 1120 determines whether the number adding the number 1 to the previous resource load $N_i$ according to the PCell connection, that is, $N_i+1$ exceeds the threshold load $N_{max}$.

When the calculated i-th resource load exceeds the threshold load, the second connection controller 1120 determines to reject the establishment request of the SCell connection for the i-th cell. That is, $N_i+1$ exceeding the threshold load $N_{max}$ means that there is no spare resource of the i-th cell. Accordingly, since it means that the resource of the i-th cell corresponds to the status not additionally allowing the SCell connection, the second connection controller 1120 determines to reject the SCell connection establishment request.

Next, the second connection controller 1120 unconfigures the setting for the power management for the SCell connection. As the i-th cell does not have resources for allowing the SCell connection, to block an additional SCell connection request, the second connection controller 1120 unconfigures the setting for measuring and reporting the power from the terminal.

Meanwhile, when the calculated i-th resource load does not exceed the threshold load, the second connection controller 1120 determines to allow the establishment request of the SCell connection for the i-th cell. When $N_i+1$ does not exceed the threshold load $N_{max}$, it means that there is spare resource of the i-th cell and accordingly, the second connection controller 1120 determines to accept the SCell connection establishment request for the i-th cell.

Although the present disclosure as described above is explained with the restricted embodiments and drawings, the present disclosure is not limited to the above embodiments and a person of ordinary skilled in the art can make variously modifications and changes from such descriptions.

The methods according to the embodiments described in the claims and/or the specification of the present disclosure can be implemented in hardware, software, or as a combination of hardware and software. When implemented in software, a computer-readable storage medium storing one or more programs (software modules) can be provided. One or more programs stored in the computer-readable storage medium are configured for execution by one or more processors in an electronic device. The one or more programs include instructions for making the electronic device execute the methods according to the embodiments described in the claims and/or the specification of the present disclosure.

Such a program (software module, software) can be stored in a random access memory, a non-volatile memory including a flash memory, a Read Only Memory (ROM), an Electrically Erasable Programmable Read Only Memory (EEPROM), a magnetic disk storage device, a Compact Disc-ROM (CD-ROM), Digital Versatile Discs (DVDs) or optical storage devices of other type, and a magnetic cassette. Alternatively, it can be stored in a memory combining some or part of them. In addition, a plurality of memories may be included.

In addition, the electronic device can store in an attachable storage device which can access through a communication network such as Internet, Intranet, Local Area Network (LAN), Wide LAN (WLAN), or Storage Area Network (SAN), or a communication network including a combination of them. Such a storage device can connect to the electronic device via an external port. In addition, a separate storage device on the communications network may connect to a portable electronic device.

The invention claimed is:

1. A method for operating a base station of a mobile communication system, the method comprising:
   determining that a terminal is requested to connect to a cell as a primary cell (PCELL);
   determining to allow the connection of the terminal based on a threshold and a first total number of terminals belonging to a first terminal group using the cell as the PCELL; and
   when the connection of the terminal is allowed, determining whether to release at least one connection of at least one terminal of a second terminal group using the cell as a secondary cell (SCELL) based on the threshold, the first total number, a second total number of terminals belonging to the second terminal group, and a third total number of connections associated with the second terminal group in each of other cells that provide at least one connection as a PCELL to the second terminal group.

2. The method of claim 1, wherein the threshold indicates a maximum number of terminals accommodated in the cell based on a processing resource for a medium access control (MAC)/physical (PHY) layer.

3. The method of claim 1, wherein determining whether to release the at least one connection of the at least one terminal comprises:
   determining a resource load of the cell based on the first total number and the second total number; and
   if the resource load exceeds the threshold, determining to release the at least one connection.

4. The method of claim 3, wherein the resource load comprises a sum of the first total number, the second total number, and a margin.

5. The method of claim 3, wherein the at least one terminal comprises a number of terminals corresponding to a reciprocal of a relative ratio of a first load occupied by one terminal having a SCELL connection to a second load occupied by one terminal having a PCELL connection.

6. The method of claim 3, wherein the determination to release at least one terminal is based on at least one of:
   a ratio of terminals belonging to the second terminal group in each of other cells that provide at least one connection as a PCELL to the second terminal group, a resource load of each of other cells that provide at least one connection as a PCELL to the second terminal group,
a duration where each terminal belonging to the second terminal group does not use a connected state, or
a channel quality of each terminal belonging to the second terminal group.

7. The method of claim 1, further comprising:
unconfiguring a setting relating to power management for the SCELL, of the at least one terminal.

8. The method of claim 1, further comprising:
detecting another request for another connection to a cell as the SCELL; and
determining to allow the another connection based on the threshold, the first total number, and the second total number.

9. The method of claim 8, wherein the determining to allow the another connection comprises:
determining a resource load of the cell based on the first total number and the second total number; and
if the resource load is less or equal to the threshold, determining to accept the another connection.

10. An apparatus for a base station of a mobile communication system, the apparatus comprising:
a memory configured to have instructions stored therein; and
a processor,
wherein, upon execution of the instructions, the processor is configured to:
determine that a terminal is requested to connect to a cell as a primary cell (PCELL),
determine to allow the connection of the terminal based on a threshold and a first total number of terminals belonging to a first terminal group using the cell as the PCELL, and
when the connection of the terminal is allowed, determine whether to release at least one connection of at least one terminal of a second terminal group using the cell as a secondary cell (SCELL) based on the threshold, the first total number, a second total number of terminals belonging to the second terminal group, and a third total number of connections associated with the second terminal group in each of other cells that provide at least one connection as a PCELL to the second terminal group.

11. The apparatus of claim 10, wherein the threshold indicates a maximum number of terminals accommodated in the cell based on a processing resource for a medium access control (MAC)/physical (PHY) layer.

12. The apparatus of claim 10, wherein the processor is further configured to:
determine a resource load of the cell based on the first total number and the second total number, and
determine to release the at least one connection, if the resource load exceeds the threshold.

13. The apparatus of claim 12, wherein the resource load comprises a sum of the first total number, the second total number, and a margin.

14. The apparatus of claim 12, wherein the at least one terminal comprises a number of terminals corresponding to a reciprocal of a relative ratio of a first load occupied by one terminal having a SCELL connection to a second load occupied by one terminal having a PCELL connection.

15. The apparatus of claim 12 wherein the determination to release at least one terminal is based on at least one of:
a ratio of terminals belonging to the second terminal group in each of other cells that provide at least one connection as a PCELL to the second terminal group,
a resource load of each of other cells that provide at least one connection as a PCELL to the second terminal group,
a duration where each terminal belonging to the second terminal group does not use a connected state, or
a channel quality of each terminal belonging to the second terminal group.

16. The apparatus of claim 10, wherein the processor is further configured to unconfigure a setting relating to power management for the SCELL, of the at least one terminal.

17. The apparatus of claim 10,
wherein the detector is further configured to detect another request for another connection to a cell as the SCELL, and
wherein the processor is further configured to determine to allow the another connection based on the threshold, the first total number, and the second total number.

18. The apparatus of claim 17, wherein the processor is further configured to:
determine a resource load of the cell based on the first total number and the second total number, and
determine to accept the another connection, if the resource load is less or equal to the threshold.

* * * * *